April 14, 1953 R. W. COWARD 2,634,822
APPARATUS FOR SEPARATING SOLID MATTER FROM GASES
Filed June 24, 1949 5 Sheets-Sheet 1

INVENTOR.
RICHARD W. COWARD
BY
Jennings & Carter
ATTORNEYS

April 14, 1953 R. W. COWARD 2,634,822
APPARATUS FOR SEPARATING SOLID MATTER FROM GASES
Filed June 24, 1949 5 Sheets-Sheet 2
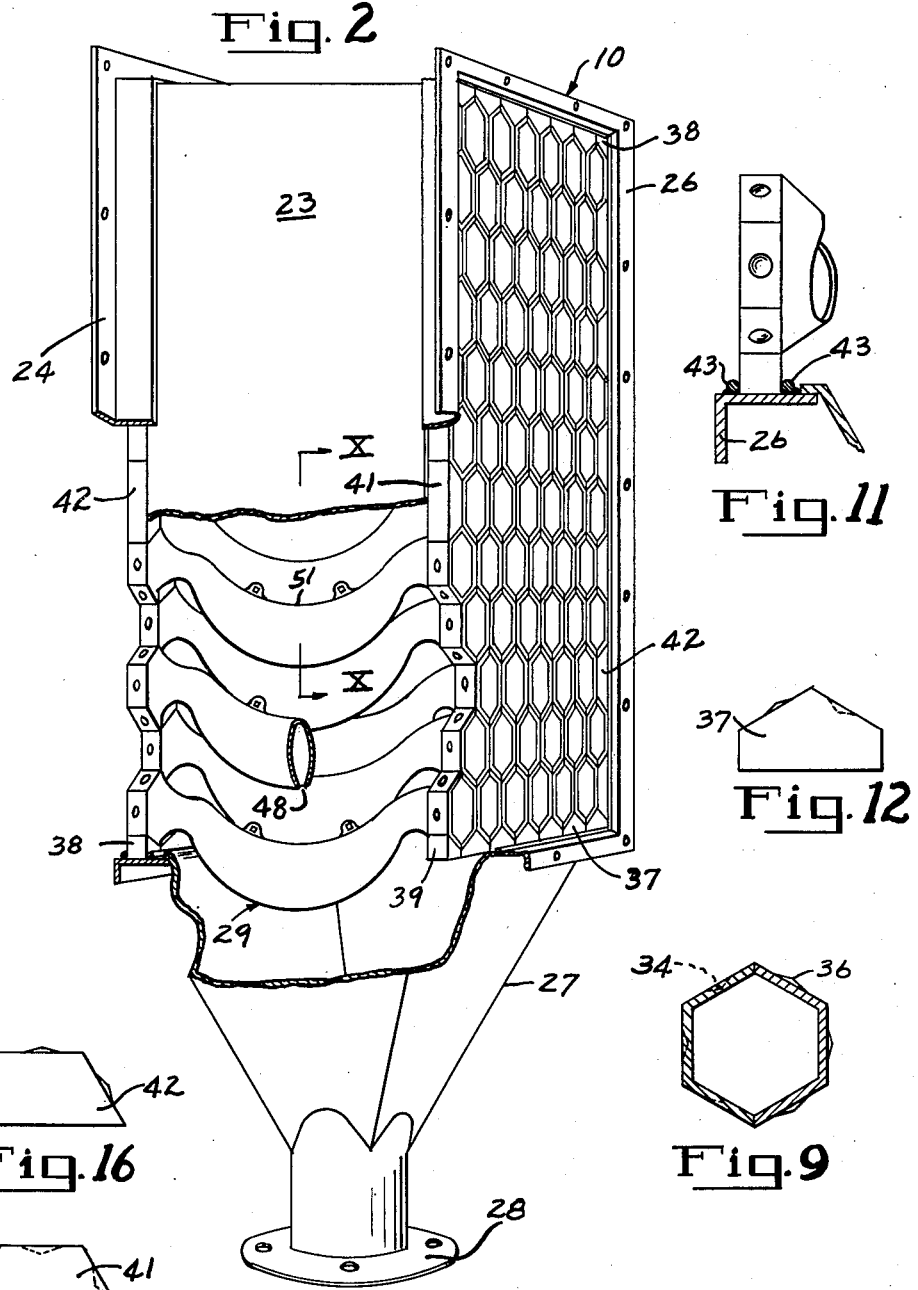

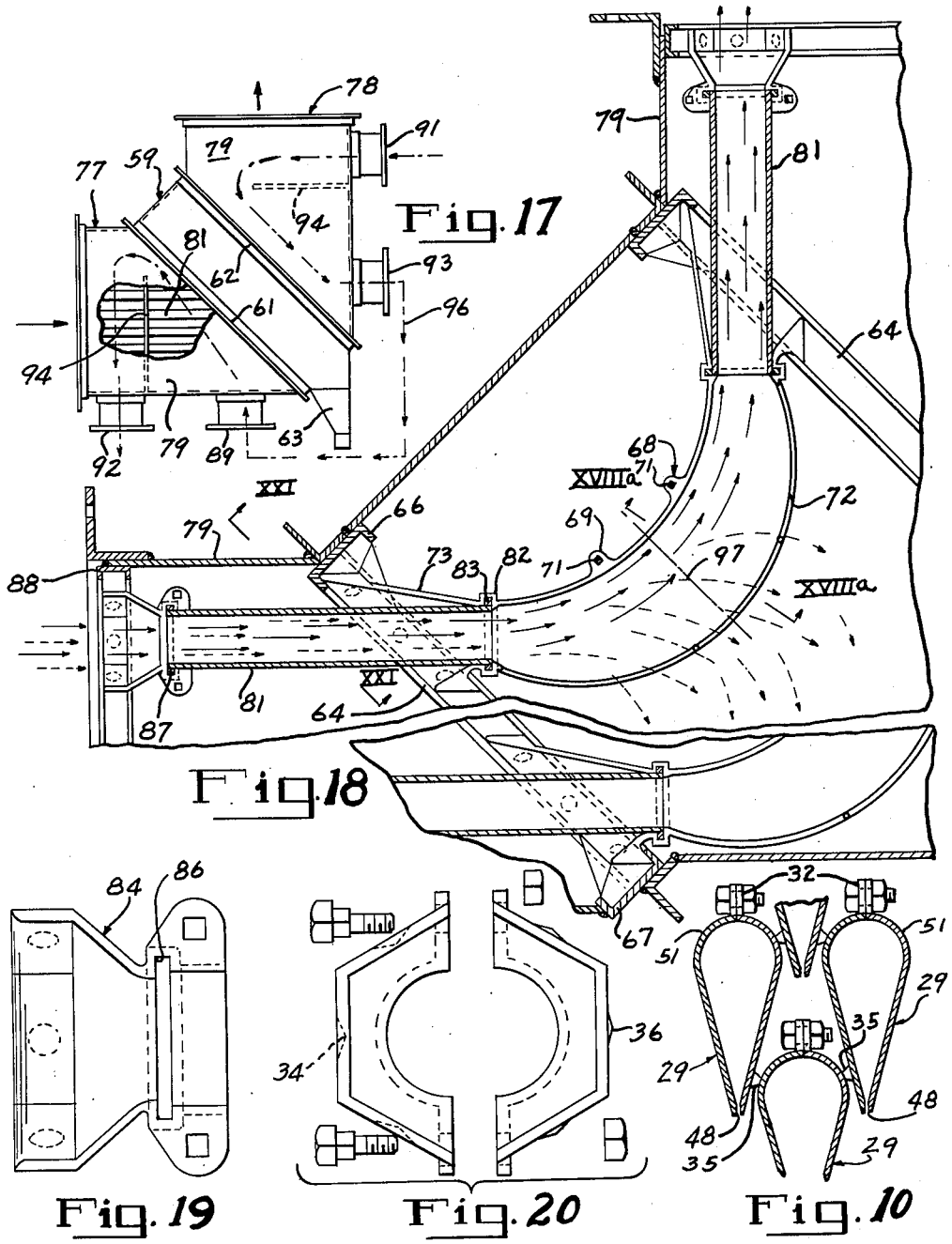

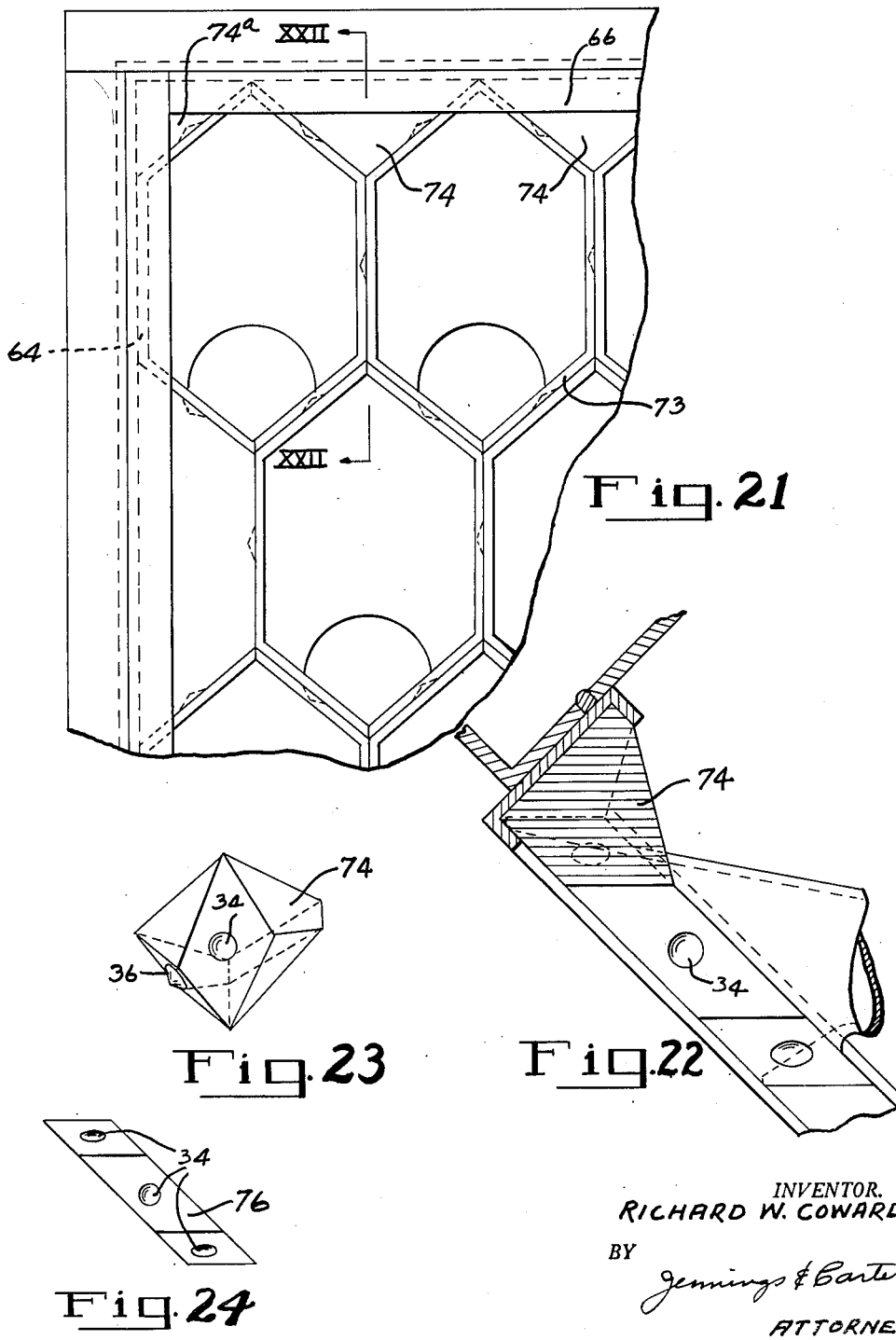

April 14, 1953 R. W. COWARD 2,634,822
APPARATUS FOR SEPARATING SOLID MATTER FROM GASES
Filed June 24, 1949 5 Sheets-Sheet 5
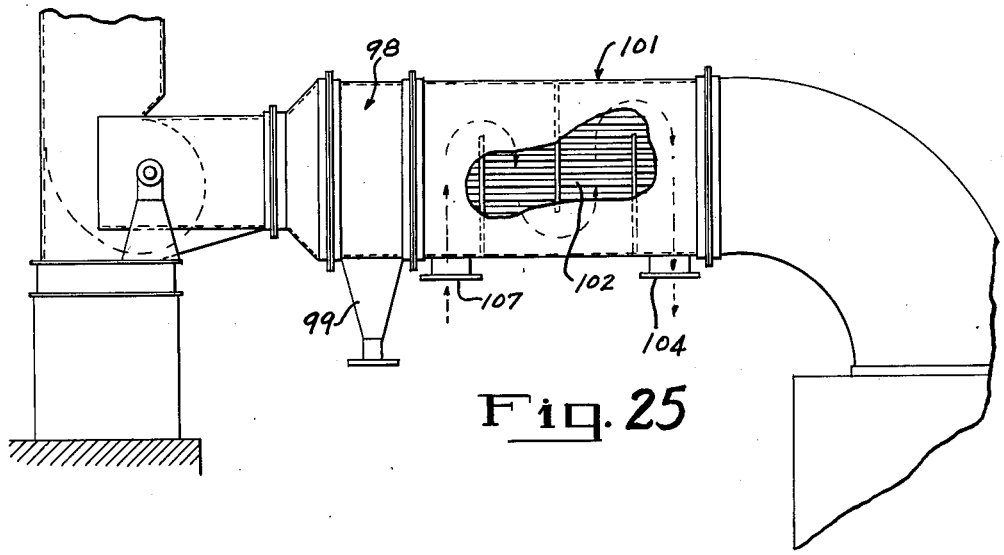
Fig. 25
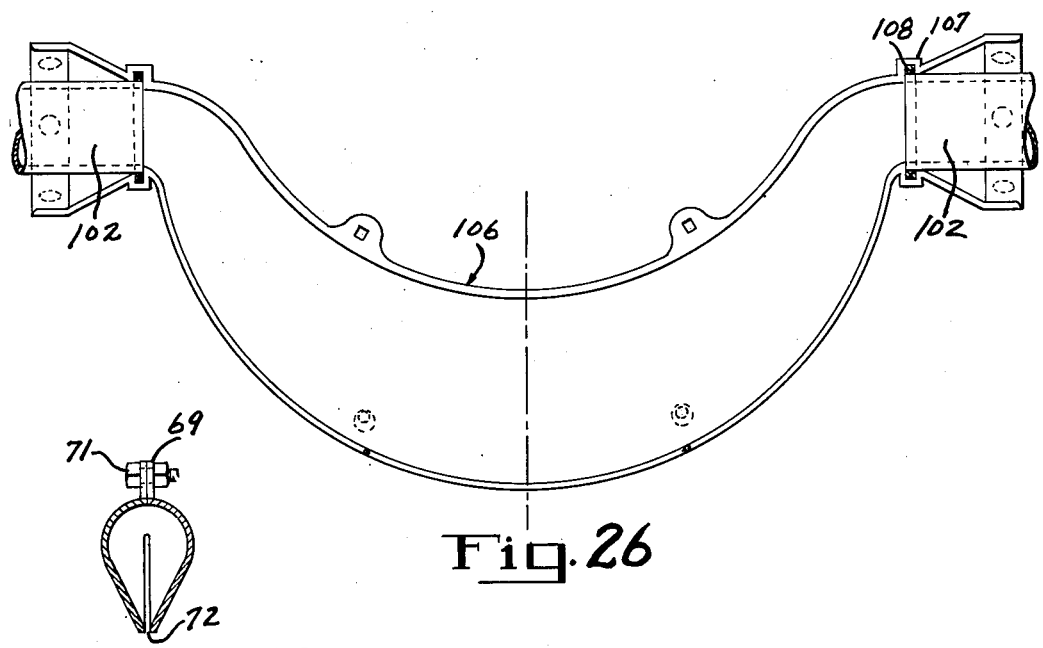
Fig. 26
Fig. 18a
INVENTOR.
RICHARD W. COWARD
BY
Jennings & Carter
ATTORNEYS

UNITED STATES PATENT OFFICE 2,634,822

APPARATUS FOR SEPARATING SOLID MATTER FROM A GAS

Richard W. Coward, Birmingham, Ala.

Application June 24, 1949, Serial No. 101,098

9 Claims. (Cl. 183—79)

My present invention relates to a method and apparatus for removing particles of solid matter from a moving stream of gas, and while not limited thereto relates particularly to apparatus for removing particles such as fly ash, cinders and the like from a moving stream of hot flue gas.

Heretofore in the art to which my invention relates, it has been proposed to provide apparatus operable for separating such particles embodying a tube or flue through which the gas borne particles were passed. Such tubes were provided with a plurality of inwardly directed lips, disposed adjacent a plurality of slots, the lips being inclined toward the direction from which the gas was moving. Such lips and slots have heretofore extended transversely of the direction of movement of the gas in the tubes. The functioning of such apparatus was premised upon the assumption that the inwardly projecting lips would trap the particles of fly ash or the like in the moving stream of gas, and cause the same to pass out of the tube through the slot, there to be collected and removed. In some prior art apparatus the tubes were curved, thus to change the direction of movement of the gas stream bearing the particles to be separated. This change in direction together with the lips and slits, while effective to remove some of the entrained solid material was not effective in so far as I am aware to remove any great quantity thereof, particularly the smaller particles. Further, and as is apparent from such constructions, the inwardly projecting lips produce turbulence in the tubes. This turbulence not only lowers the collecting efficiency of the apparatus but substantially increases the draft losses over those produced in smooth tubes, and increases the power required to maintain the necessary draft on the furnace with which the apparatus is associated.

The prime object of my invention therefore is to provide a method and apparatus for separating out of a moving stream of gas both light and heavy particles entrained therein, and which shall be effective to remove a high percentage of such particles with minimum draft loss.

Another object is to provide a method of separating entrained particles of solid matter from a moving stream of gas which consists essentially in utilizing the combined effects of a change in the direction of the gas stream and the force of gravity to cause said entrained particles to move toward the lower side of the moving stream of gas, and in then removing the same entirely from the stream.

My invention contemplates a method of the character designated in which a stream of gas moving rectilinearly is directed into a curved, substantially confined space which increases in cross sectional area from the inlet end, thereby simultaneously to decrease the velocity of the air stream and change its movement from a rectilinear path to a curved path, causing the entrained particles to move both by the effect of gravity and said change in direction to the lower side of the stream of gas, and then in removing the particles entirely from said stream.

Another object is to provide a method of the character designated which consists in introducing a moving stream of gas into a substantially confined curved space which is cylindrical in cross section at one side along the length thereof, and which increases in cross sectional area from the inlet end toward the longitudinal center, then decreases in cross sectional area from its longitudinal center toward the discharge end, whereby the particles to be removed are caused, by the action of gravity, the change in direction and decrease of velocity of the air stream entraining them, to move out of the zone in said space in which the stream is moving at a high velocity into a zone therein in which the gas is moving at a lower velocity, and in then removing said particles from the zone of lower velocity.

More specifically, and with respect to my improved method, my invention contemplates such a method which comprises moving the stream of gas through an elongated curved space of such cross sectional configuration that there exists in said space along one side thereof a zone of relatively high velocity, and at the other side thereof, preferably the bottom side, a relatively quiescent zone into which the particles move as the stream of gas bearing the same moves along in a curved path principally in the high velocity zone, and then in removing the particles from the quiescent zone.

Another object of my invention is to provide an apparatus of the character designated embodying a plurality of relatively small diameter, short tubes, constructed and arranged to provide curved paths for the flow of gases therethrough, together with a slot in the bottom of each tube extending longitudinally thereof through which the entrained particles are discharged, together with means to hold a plurality of said tubes nested together to form a complete unit.

Another object is to provide slotted tubes which are effective to reduce the velocity of the gases while passing therethrough, thus to aid the particles to be separated in falling through the slots in the bottom of the tube.

Another object is to provide apparatus as above described which shall have high particle separating efficiency at low velocity therethrough of the gases entraining such particles, thus to further reduce draft losses and reduce to a minimum the abrasive action of the particles on the apparatus.

Further objects are to provide apparatus of the character designated which embodies no moving parts; in which the supporting units are of standard size both in length and cross section, thus making it possible to assemble apparatus having varying capacities from such standard parts; to provide heat exchangers associated selectively on the inlet or discharge side of the apparatus, or on both sides; and in which the separating tubes forming the principal parts of the apparatus lend themselves to economical production as by casting.

Apparatus embodying features of my invention is shown in the accompanying drawings forming a part of this application in which:

Fig. 2 is a sectional perspective view of the arrestor itself detached from the remaining mechanism;

Figure 1:
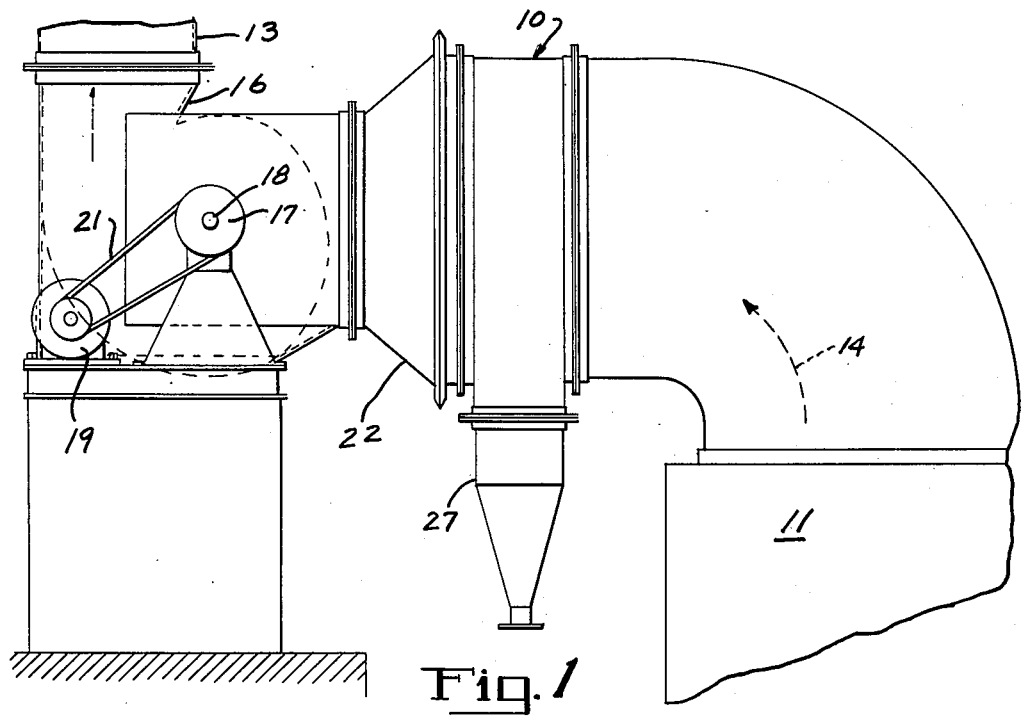
Fig. 1 is a side elevational view, partly broken away, showing my improved arresting mechanism interposed between the fire box outlet of a furnace and a draft stack.
Figures 3, 4, 5, 6, 7, 8:
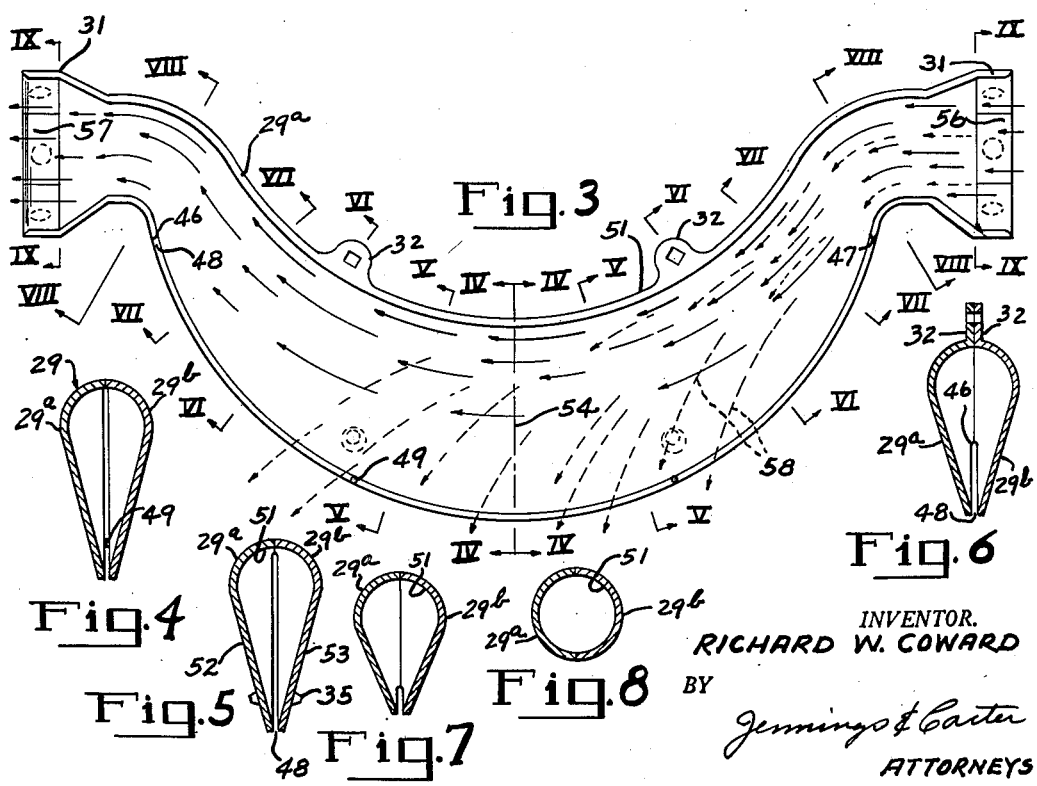
Fig. 3 is a side elevational view looking at the inside of a half of one of the arresting tubes used with the apparatus shown in Figs. 1 and 2.

Figs. 4 to 9 inclusive are detailed sectional views taken generally along the respective lines indicated on Fig. 3 and with the other half of the tube shown in place;

Fig. 10 is a detail sectional view taken generally along line X—X of Fig. 2 and illustrating the nesting of the tubes adjacent their longitudinal centers;

Fig. 11 is a detail sectional view illustrating one method of supporting the ends of the tubes in the framework of the arrestor housing;

Figs. 12 to 16 inclusive are detail views of the several types of fill-in blocks required to support the ends of the tubes of the apparatus shown in Figs. 1 and 2 about the perimeter of a nested group thereof;

Fig. 17 is a side elevational view, partly broken away of a modified form of my invention in which the arrestor is placed in a 90° bend of the flue gas conduit and showing heat exchangers at the inlet and discharge ends of the arrestor;

Fig. 18 is an enlarged fragmental sectional view through the apparatus shown in Fig. 17;

Fig. 18a is a detail sectional view taken on line XVIIIa—XVIIIa of Fig. 18;

Fig. 19 is a view looking at the inside of one-half of one of the split collars used for supporting the outer end of the tubes forming a part of the heat exchangers shown associated with the apparatus in Figs. 17 and 18;

Fig. 20 is an exploded end elevational view of a pair of the air heater tube supporting collars;

Fig. 21 is an enlarged detailed view taken generally along line XXI—XXI of Fig. 18 with the heat exchanger tubes removed for the sake of clarity;

Fig. 22 is a detail fragmental sectional view taken along line XXII—XXII of Fig. 21;

Fig. 23 is a perspective view of one of the odd shaped filler blocks used for filling in about the perimeter of the hexagonally shaped ends of the arrestor tubes of the apparatus shown in Figs. 17 and 18;

Fig. 24 is a side elevational view of another one of the filler blocks used with the apparatus shown in Figs. 17 and 18;

Fig. 25 is a still modified form of my invention in which the arrestor and a heat exchanger tube associated therewith are disposed in a straight portion of the flue gas conduit; and, Fig. 26 is a view similar to Fig. 3 and showing a form of arrestor tube which I prefer to use with the device shown in Fig. 25.

Referring now to the drawings for a better understanding of my invention, and more particularly to Figs. 1 to 16, inclusive, my improved arrestor, indicated generally by the numeral 10 is interposed in the stack between the smoke box 11 of a furnace, not shown, and the stack or chimney 13. The gases from the smoke box move upwardly and to the left as shown by the arrow 14. At 16 I indicate an induced draft fan, having a pulley 17 on its shaft 18, and driven by a motor 19 through a belt 21. The inlet side of the fan is connected by a suitable transition piece 22 to the discharge side of my improved arrestor 10.

As shown more clearly in Fig. 2, my improved arrestor comprises an outer shell 23 open at both ends. The shell may be fabricated of plates, and extending around the perimeter thereof at the open end are angles 24 and 26 forming connecting flanges for the arrestor. The casing is extended to provide a hopper bottom 27 provided at its lower end with a connecting flange 28 for discharging material collected by the collector in the manner to be explained.

Disposed in the shell in the manner shown more clearly in Fig. 2 are a plurality of arrestor tubes indicated generally by the numeral 29. As shown in the detailed views, Figs. 3 to 10, inclusive, each of the tubes 29 comprises identical halves 29a and 29b. The tube halves have three sided ends 31, and each half has lugs 32 at the top thereof for receiving a suitable bolt and nut for holding the halves together. On one end, each half is provided, in the flat surfaces of the sides with a plurality of sockets 34, while at its opposite end the flat surfaces are provided with complementary protuberances 36, disposed to fit into the sockets of adjacent members in the manner to be explained. The halves when put together as shown in the drawing provide a complete tube having hexagonal ends with the sockets 34 on three of the flat sides, and the protuberances 36, on the other three sides thereof. Thus, when a plurality of such assembled tubes are nested together as shown in Fig. 2 of the drawing the flat surfaces of the ends fit together, and the protuberances and sockets hold the same nested, and prevent longitudinal movement of the tubes. Adjacent their longitudinal midpoints the tubes are provided with lugs 35 adapted to contact the sides of adjacent tubes, thereby to support the tubes at the center. In order to complete the assembly within the rectangular framework of the casing I provide a plurality of odd shaped filler blocks 37, 38, 39, 41 and 42 adapted to fit into the spaces between the hexagonal ends of the tubes left about the perimeter of the nested group. Certain of these blocks have protuberances 36, while the others have the sockets 34, all as will be readily apparent from an inspection of the drawing. These blocks are held in place against shifting longitudinally of the tubes by means of a pair of rods or the like 43 which may be welded in spaced apart relation to one flange of the peripherally extending angle 26.

As shown clearly in the detail views, Figs. 4 to 10, inclusive, the lower edges of the tube halves are cut back along the entire bottom wall thereof from the point 46 to the point 47, thereby to provide a slot 48 in the bottom of the assembled tube when the halves are brought together. Thus, each assembled tube 29 is curved in the manner shown in the drawing and is provided with the slot 48 in its lower side. Intermediate the ends of the slotted side I may provide abutting lugs 49 which are disposed to maintain the slots at a given width if the tubes tend to expand or twist.

More particularly describing the form of tube shown in Fig. 3 of the drawing, it may be said that the same embodies a circular upper portion 51 and tangential sides 52 and 53 depending from the circular portion 51 and converging toward each other at the bottom. The slot 48 is defined by the lower ends of the tangential sides. Likewise, while the radius of the portion 51 remains constant throughout the length of the tube, the depth of the tube increases from each end toward the longitudinal mid-point 54 as shown in the drawing. It will thus be apparent that the cross sectional area of the tube increases from each end toward its longitudinal mid-point 54.

Each of the tubes 29 follows downwardly on an ogee curve of two 45° arcs from its inlet end 56 to its longitudinal mid-point 54. From the point 54 to the discharge end 57 the tubes curve reversely so that the inlet and discharge ends lie in common vertical and horizontal planes. The tube thus is symmetrical about its longitudinal mid-point 54, both in transverse and longitudinal section. The tube defines a substantially closed downwardly and thence upwardly curving space which increases in volume from either end to its longitudinal mid-point.

From what has been said, the construction and operation of the invention so far described may now be explained. With the induced air fan 16 in operation, flue gases from the boiler entraining the particles of solid material to be removed are drawn upwardly through the connecting pipe as shown by the arrow 14 and into the inlet end 56 of the nest of tubes 29. As the gases move through the tubes they are simultaneously moved downwardly and their velocity decreased due to the increase in cross sectional area of the tubes. From the longitudinal mid-point 54 the reverse of this action is true, the velocity again increasing and the path of movement of the gases being changed to an upward direction. I have discovered that under such conditions the particles of matter entrained with the flue gases move, both due to the action of gravity and the decrease in the velocity of the gases entraining the same, downwardly as indicated by the arrows 58. Such particles thus fall out of the slots 48 of the tubes and thence into the hopper bottom 27 of the collector shell.

Considering specifically Fig. 3 of the drawing, it will be seen that in the upper part of each tube there is a zone of relatively high velocity gas while at the lower side of each tube there is a relatively quiescent zone. I attribute this to the fact that the gases passing through each of the tubes tends to take the shortest path therethrough, namely to follow very closely the inside of the upper wall of each tube, namely the circular portion 51. In practice I have found that tubes of this kind readily permit very large percentages of all entrained solid matter to be forcibly thrown through the slots. I have further found that the tangential sides of the tube are important due to the fact that the particles coming out of the relatively high velocity zone at the top tend to hit the sides and rebound therefrom. By making the included angle between the tangentially depending sides rather small, for instance on the order of 30°, such particles hitting the side wall and rebounding therefrom onto the opposite side wall always move downwardly, where they are discharged through the slots 48. I have further found that I am enabled to obtain a separation of foreign matter in such gases with relatively low velocity, and that these velocities are well below the rate at which undesirable abrasion by the particles on the walls of the tubes would take place.

Referring now more particularly to Figs. 17 to 24, inclusive, I show a modified form of my invention adapted for insertion in a right angle turn in the breeching. Also, with this modification I show fore and after air heaters by means of which heat may be removed from the gases, thus to recover the heat and also to aid in reducing the velocity through the arrestor as will now be explained.

As shown particularly in Fig. 17, this form of my invention comprises a housing 59 having angles 61 and 62 adjacent the open ends thereof. The housing is disposed at 45° to the horizontal, and has a hopper like bottom portion 63 into which material removed from the gas stream is collected.

On the inside of the housing 59, along the sides thereof are channels 64 with their legs inturned. Across the top and bottom of the housing adjacent each end are wider channels 66 and 67 with their flanges likewise inturned. The arrestor tubes 68 comprise divided halves having lugs 69 for receiving bolts 71 adapted to hold the halves together. At the bottom of each half is a slot 72 similar to the slot 48. The tubes curve upwardly continuously through an angle of 90° as clearly shown in Fig. 18. Each end of the tubes, when the halves are mated, provide hexagonal ends indicated generally by the numeral 73, and which nest together in the manner indicated in Fig. 21. The width of the projecting portions of the ends 73 of the tubes 68 are such as to fit between the narrower channels 64 at the sides of the shell. The surfaces of the hexagonal ends are provided with the sockets 34 and the protuberances 36 as already explained. A group of such tubes may thus be placed within the casing 59, in stacked relation, and the spaces at the periphery thereof may be suitably closed by means of the odd shaped filler blocks 74 and 76 shown respectively in Figs. 23 and 24. At the corners of the casing, there are blocks 74a which in effect are the blocks 74 divided in half as will be apparent. It will be seen that the blocks 74 fit with one side thereof in the wider channels 66 and 67, and thus stabilize the tubes against vertical shifting after the same are assembled in the casing. The inner flanges of the channels 64 at the top and bottom are cut away to admit the filler blocks 74a.

While not essential to the functioning of the apparatus being described, I prefer to use therewith heat exchangers 77 and 78 disposed respectively at the inlet and discharge ends of the arrestor. Each of these heaters comprises an outer shell 79 having mounted therein a plurality of cylindrical tubes 81 through which the flue gases pass. At their inner ends the tubes 81 are supported in the ends of the tubes 68, and for this purpose I provide a gland 82 on each end of the tubes 68, and suitable packing 83. At the outer ends I support the tubes by means of divided hexagonal collars 84, the construction of which is illustrated particularly in Figs. 19 and 20. These collars have the sockets 34 and protuberances 36 in the manner already explained, and also have an annular gland 86 for receiving suitable packing 87. The hexagonal ends of such collars are filled in by means of the blocks such as are illustrated in Figures 12 to 16, inclusive. These blocks may conveniently be held in channels 88 with their flanges in-turned, or, the welded rods 43 may be used for this purpose in the manner illustrated in Fig. 11.

Air may be admitted through suitable flanges 89 and 91 of the heaters 77 and 78, and withdrawn through flanges 92 and 93 thereof. Such air may be caused to circulate more effectively around the tubes 81 by means of baffles 94. If desired, the two heaters 77 and 78 may be operated in series by connecting the same as indicated by the line 96, Fig. 17.

The functioning of the modification just described is quite similar to that already described in connection with Figs. 1 to 16 inclusive. The flue gases entraining the solid matter to be removed may be admitted to the heater tubes 81 first through the heat exchanger 77, as indicated by the arrows Fig. 18, and passed from the tubes 81 into the tubes 68. The gases thus are introduced rectilinearly into the tubes 68, the latter curving upwardly as shown, and thence the gases are removed in a rectilinear direction from the tubes 81 of the heat exchanger 78. While in the tubes 68 the combined actions of gravity and the change of direction cause the particles of matter entrained with the gases to be thrown out of the slot 72. Each of the tubes 68 also is symmetrical both in transverse and longitudinal section about its longitudinal mid-point 97, and increases from each end in depth to the mid-point 97. By drawing air through the heat exchangers it will be apparent that heat is removed from the gas reducing its volume, and likewise that its volume is further reduced while in the tubes 68. I thus not only save heat to be used for any suitable purpose, but also lower the velocity of the entraining gas to aid in separating the material entrained therewith.

I have found in practice that the arrestor just described operates efficiently when turned at any angle to the horizontal so long as the slots are on the lower side of the tubes. Also, I have found that the gases may be passed therethrough in either direction without material change in the separating efficiency. Material separated is thrown out of the tubes and passes out through the hopper bottom 63.

Referring now more particularly to Figs. 25 and 26, I show a further modified form of my invention associated with a heat exchanger, both units being disposed in a straight line portion of the breeching. In this instance, the arrestor embodies a casing 98, similar to the casing 23 and having a hopper bottom 99 similar to the bottoms 27 and 63. The heater 101 embodies a plurality of heat exchange tubes 102, similar to the tubes 81. Air to be heated is passed into a connection 103 and out a connection 104.

The arrestor comprises tubes 106 identical with the tubes 29 shown particularly in Fig. 3 except that they also embody glands 107 and packing 108 for receiving the ends of the heater tubes, quite similar to those shown at 82 and 83 in Fig. 18. The functioning of this apparatus is identical with that described in connection with Fig. 3 except that the heater 101 removes a considerable portion of the heat from the gases, further reducing their volume and hence their velocity through the tubes 106.

From the foregoing it will be apparent that I have devised an improved arrestor for removing entrained particles of solid material from a moving stream of gas. In actual practice I have found that tubes approximately twenty-six inches long and with a rounded upper portion of approximately two and one-quarter inches in diameter and of a maximum depth of approximately four and one-half inches at the longitudinal mid-point are highly satisfactory. For the usual purposes of removing cinders and fly ash from moving streams of gas I have found that the slot at the bottom of the tubes should be from one-eighth to three-eighths inch wide. Also, in the installations heretofore made by me I have found that my improved arrestor is far more efficient when operated under suction than when operated under pressure. The reason for this is not clearly understood by me but I attribute it to the fact that there is more turbulence on the discharge side of a fan than exists on the inlet side. Turbulence in the arrestor tubes, when the same are operated under pressure, adversely affects the separating efficiency thereof. I have further found that I can provide an arrestor having varying capacities with the same type and size of tubes simply by adding more tubes to a nest of the same. With either modification of my invention I have found that as much as one hundred per cent change in gas velocity through the tubes causes only a small change, say of two to three per cent, in the separating efficiency. My improved apparatus is thus particularly adapted for use in steam plants wherein the load and consequently the gas velocity varies between wide limits. The reverse of the above is true in the cyclonic type arrestors, namely, that the collecting efficiency thereof falls off sharply with decrease in gas velocities through the same. Further, due to the compactness of my improved arrestor, I am enabled to install the same in a minimum of space, and in some instances where other types of apparatus cannot be installed without major undesirable changes in the breechings. I have found that the tubes are entirely self-cleaning.

While I have described herein heat exchangers for removing heat from the gases entraining the solid particles, there may be cases wherein it is desired to use the same to raise the temperature of such gases before or after removing the particles. In the claims therefore the expression "heat exchanger" comprehends both types of such apparatus.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claims.

What I claim is:

1. In apparatus for removing particles of solid matter entrained with a moving stream of gas, a plurality of elongated tubes having a curved portion through which said gas passes, each of said tubes comprising a section partially circular in transverse cross section, converging walls extending tangentially from the partially circular section on the side of the tube diametrically opposite the partially circular section, there being a slot of a width to pass said particles defined between the ends of said walls and extending substantially the length of the curved portion of the tube, and means holding the ends of the tubes in nesting relation.

2. In apparatus for removing particles of solid matter entrained with a moving stream of gas, a plurality of horizontally disposed tubes each formed of a pair of longitudinally divided curved sections disposed when brought together in abutting relation to form a complete tube, each of said halves comprising a substantially arcuate upper portion and a side wall extending tangentially from and below the arcuate portion and converging toward the other half, the ends of said tangential walls stopping short of each other to define between them a relatively narrow elongated slot extending longitudinally along the lower surface of the tube substantially the length thereof, and means securing said halves together.

3. In apparatus for removing particles of solid matter entrained with a moving stream of gas, a plurality of elongated curved tubes having a longitudinally extending slot in one side, each of said tubes increasing in transverse cross sectional area from the inlet end to a point adjacent the longitudinal center, and means to pass said gas entraining the particles through the tube.

4. In apparatus for removing particles of solid matter entrained with a moving stream of gas, a plurality of horizontally disposed elongated curved tubes comprising a partially circular upper portion of substantially constant diameter from end to end of the tube, side walls depending from the circular portion and converging inwardly toward each other, said side walls increasing progressively in length from both ends of the tube to a point adjacent the longitudinal mid-point thereof, there being a relatively narrow longitudinally extending slot defined between the lower adjacent ends of said converging side walls, and means to direct the gas entraining said particles into the tubes.

5. Apparatus as defined in claim 4 in which said tubes are symmetrical both in transverse and longitudinal section about the longitudinal mid-point.

6. Apparatus as defined in claim 4 in which said tubes embody straight inlet and discharge end sections, and in which the central curved section is in the form of a pair of 45° ogee curves.

7. For use in separating particles of solid matter entrained with a moving stream of gas, a tube comprising inlet and discharge ends circular in transverse cross section, a curved intermediate portion arcuate in transverse section equal substantially the diameter of the circular ends, side walls joined tangentially to the intermediate arcuate portion and converging toward each other, said side walls being of maximum length adjacent the longitudinal mid-point of the tube and decreasing in length toward each end of the tube, and a slot for passing said particles defined between the adjacent ends of said side walls.

8. Apparatus as defined in claim 7 in which the ends of said tubes are aligned as the tube is viewed in side elevation and in plan, and in which the intermediate portion is curved a total of 90°.

9. Apparatus as defined in claim 7 in which the ends of said tubes are aligned as the tube is viewed in side elevation and in plan and in which the intermediate portion is sinuously curved 45° in one direction and thence 90° in the reverse direction and thence 45° in the first named direction as viewed in side elevation.

RICHARD W. COWARD.

References Cited in the file of this patent

UNITED STATES PATENTS

| Number | Name | Date |
|---|---|---|
| 1,690,108 | Grady | Nov. 6, 1928 |
| 2,047,568 | Lissman | July 14, 1936 |
| 2,360,066 | Loumiet et al. | Oct. 10, 1944 |
| 2,515,894 | Polk | July 18, 1950 |

FOREIGN PATENTS

| Number | Country | Date |
|---|---|---|
| 21,731 | Great Britain | Mar. 26, 1914 |
| 336,620 | Great Britain | Oct. 17, 1930 |